United States Patent [19]
Sakakibara et al.

[11] Patent Number: 5,690,875
[45] Date of Patent: Nov. 25, 1997

[54] METHOD AND APPARATUS FOR MANUFACTURING SURFACE FASTENER

[75] Inventors: Keisuke Sakakibara; Ryuichi Murasaki; Tsuyoshi Minato, all of Toyama-ken, Japan

[73] Assignee: YKK Corporation, Tokyo, Japan

[21] Appl. No.: 575,596

[22] Filed: Dec. 20, 1995

[30] Foreign Application Priority Data

Dec. 26, 1994 [JP] Japan ................. 6-322182

[51] Int. Cl.⁶ .................. B29C 47/32; B29C 47/90
[52] U.S. Cl. ............... 264/146; 264/167; 264/177.16; 264/177.17; 425/224; 425/316; 425/325; 425/327; 425/378.1; 425/471
[58] Field of Search ................. 264/146, 147, 264/166, 177.1, 167, 177.17, 177.19, 177.16; 425/327, 115, 316, 325, 471, 224, 378.1

[56] References Cited

U.S. PATENT DOCUMENTS

| | | | |
|---|---|---|---|
| 3,256,376 | 6/1966 | Leedy et al. | 425/327 |
| 3,541,216 | 11/1970 | Rochlis . | |
| 3,590,109 | 6/1971 | Doleman et al. | 264/167 |
| 3,758,657 | 9/1973 | Menzin et al. | 264/166 |
| 4,176,149 | 11/1979 | Moertel | 264/166 |
| 4,532,098 | 7/1985 | Campbell et al. | 264/167 |
| 4,540,357 | 9/1985 | Campbell et al. . | |
| 4,794,028 | 12/1988 | Fischer . | |
| 5,057,259 | 10/1991 | Parmelee | 264/167 |
| 5,260,015 | 11/1993 | Kennedy et al. | 264/167 |
| 5,393,475 | 2/1995 | Murasaki et al. | 264/167 |
| 5,441,687 | 8/1995 | Murasaki et al. | 264/173.1 |
| 5,512,234 | 4/1996 | Takizawa et al. | 264/167 |

FOREIGN PATENT DOCUMENTS 56-155734  12/1981  Japan ........................... 264/167

Primary Examiner—Jeffery R. Thurlow
Attorney, Agent, or Firm—Hill, Steadman & Simpson

[57] ABSTRACT

A high-quality molded surface fastener is manufactured by extruding molten thermoplastic resin, in a predetermined width, from an extrusion nozzle to a circumferential surface of a die wheel having a multiplicity of engaging-element-forming cavities, driving the die wheel for rotation, and molding a multiplicity of engaging elements integrally with a plate-like substrate sheet. At the same time, pseudo elements are molded integrally with the substrate sheet along opposite side edges, using pseudo-element-forming cavities in opposite side circumferential surfaces of the die wheel simultaneously. With the pseudo elements, the molded surface fastener is peeled off the die wheel under a uniform peeling force through the entire width of the substrate sheet. Thus the high-quality surface fastener can be obtained.

10 Claims, 7 Drawing Sheets

FIG. I

METHOD AND APPARATUS FOR MANUFACTURING SURFACE FASTENER

BACKGROUND OF THE INVENTION

1. Field of the Invention

This invention relates to a method mid apparatus for continuously molding a surface fastener, which is composed of a substrate sheet and a multiplicity of engaging elements in the shape of hooks, by extrusion using thermoplastic resin, and more particularly to a method and apparatus for continuously molding a surface fastener in which hooks are molded in a uniform posture in every row on a substrate sheet.

2. Description of the Related Art

The technology of extruding a substrate member using thermoplastic resin and, at the same time, molding hook members on one surface of the substrate member is already known by, for example, U.S. Pat. No. 4,794,028. The molding method disclosed in this U.S. Patent comprises extruding molten thermoplastic resin between a drum-shape die wheel, in which a multiplicity of mold discs and a multiplicity of spacer plates are laminated alternately and a pressure roller, the die wheel and the pressure roller rotating oppositely, to force the resin into hook-member-forming cavities of the mold discs, then pressing the resin on the drum surface to form a substrate member, and pulling molded hook members out of the cavities along with the substrate member along the rotation of the drum while the resin is cooled. After that, opposite side edges of the substrate member are trimmed. The mold disc has in one side surface hook-shape cavities extending radially from the circumferential surface toward the center and spaced circumferentially at predetermined distances. The side surfaces of the spacer plate are flat.

In the above-mentioned conventional molding method, when the molded hooks serving as engaging elements are removed off the cavities, a removal resistance would act to cause pulling forces on the substrate sheet. Distribution of the pulling forces is not uniform in the transverse direction of the substrate sheet, in general gradually increasing from the opposite side edges of the substrate sheet toward the center. Presumably this phenomenon would occur for the following two primary causes.

As one primary cause, partly since the engaging-element-forming cavities are arranged on the circumferential surface of the die wheel for forming engaging elements only at the effective region of a molded surface fastener, and partly since opposite side regions of the circumferential surface of the die wheel for forming opposite side edges of the substrate sheet are merely flat, firstly the opposite side edges of the substrate sheet are peeled by a small peeling force, then the engaging elements existing at opposite marginal regions are removed off and finally the engaging elements of the central region are removed off, when the molded surface is removed from the circumferential surface of the die wheel. As a result, the central region of the substrate sheet would be expanded to a larger extent than the opposite side edges of the substrate sheet, which deteriorates the quality of product.

As the other primary cause, the substrate sheet and the engaging elements molded on the circumferential surface of the die wheel are not uniform in temperature distribution in the transverse direction of the die wheel. In other words, as the die wheel is cooled from inside and/or outside of the die wheel by a suitable cooling unit, since opposite end surfaces of the die wheel are cooled always by the cooling unit as exposed to outside, the opposite side regions of the circumferential surface of the die wheel would be lower in temperature than the central region. Additionally, since there is a difference in heat capacity between the engaging-element-existing region and the engaging-element-free region, the small-heat-capacity opposite side edges of the substrate sheet would be cooled earlier than the large-heat-capacity and central region of the substrate sheet having engaging elements. As a result, the opposite side edges of the substrate sheet would be expanded to a less extent than the central region of the substrate sheet, which deteriorates, the quality of product further.

FIGS. 9 through 11 schematically show the manner in which a surface fastener is manufactured by the conventional method. In FIG. 10, the molded surface fastener semiproduct is cut longitudinally along three cutting lines A, B, C to sever the opposite edges and, at the same time, to continuously provide two continuous-length surface fasteners. FIG. 9 shows the molded surface fastener as a semiproduct before having been cut; the semiproduct assumes an arcuate shape as viewed in front elevation. FIG. 11 shows a surface fastener as a final product as having been cut; the final product is curved as its one edge portion shrinks.

SUMMARY OF THE INVENTION

It is therefore an object of this invention to provide a method and apparatus for manufacturing a high-quality molded surface fastener as the above-mentioned primary causes with the conventional art are eliminated.

A specific object of the invention is to provide a method and apparatus for manufacturing a molded surface fastener in such a manner that distribution of peeling resistance and heat capacity is uniform transversely of the molded surface fastener and that distribution of transverse expansion is uniform during peeling.

According to a first aspect of the invention, the above objects are accomplished by a method of continuously manufacturing a surface fastener, comprising: extruding molten thermoplastic resin, in a predetermined width, from an extrusion nozzle to a circumferential surface of a die wheel having a multiplicity of engaging-element-forming cavities; driving the die wheel for rotation; molding a multiplicity of engaging elements integrally with a plate-like substrate sheet while filling the molten thermoplastic resin in the cavities of the die wheel in rotation; and molding pseudo elements integrally with the substrate sheet along opposite side edges, using pseudo-element-forming cavities in opposite side circumferential surfaces of the die wheel, simultaneously with the molding of the engaging elements.

In the method, after molding the surface fastener, the substrate sheet is cut longitudinally between the engaging elements and the pseudo elements. The die wheel is cooled from outside or inside by cooling means.

Preferably, the extrusion nozzle is directed toward the axis of rotation of the die wheel for extruding molten thermoplastic resin, in a predetermined width, directly to the circumferential surface of the die wheel. In an alternative way, a pressure wheel is situated facing the die wheel with their axes in parallel, and the extrusion nozzle is situated facing a pressure space between the die wheel and the pressure wheel foe extruding molten thermoplastic resin in the predetermined width into the pressure space.

According to a second aspect of the invention, the above objects are accomplished by an apparatus for continuously manufacturing a surface fastener, comprising: a die wheel having in its circumferential surface a multiplicity of engaging-element-forming cavities and adapted to be driven for rotation in one way; and an extrusion nozzle situated facing the circumferential surface of the die wheel and having inside a predetermined width of molten thermoplastic resin extrusion channel. The apparatus is characterized by that the die wheel further has in opposite side circumferential surfaces a plurality of pseudo-element-forming cavities spaced a predetermined distance from the engaging-element-forming cavities.

Preferably, each of the pseudo-element-forming cavities has a transverse thickness larger than that of each of the engaging-element-forming cavities. The die wheel is equipped with cooling means.

Further, the extrusion nozzle is directed toward the axis of rotation of the die wheel with a predetermined space between the extrusion nozzle and the circumferential surface of the die wheel. Alternatively, a pressure wheel is situated facing the die wheel with their axes in parallel, the extrusion nozzle being directed to a pressure space between the die wheel and the pressure wheel.

In operation, molten thermoplastic resin is extruded under a predetermined extrusion pressure from the extrusion nozzle to the circumferential surface of the die wheel in rotation; part of the extruded molten thermoplastic resin successively fills in the engaging-element-forming cavities and the pseudo-element-forming cavities to continuously mold engaging elements and pseudo elements as well as a plate-like substrate sheet having a predetermined thickness and a predetermined width. The thus molded substrate sheet, engaging elements and pseudo elements are cooled by a suitable cooling means to become solidified as they are revolved on the circumferential surface of the die wheel through a predetermined range. During this solidification, as they are taken up under a suitable pulling force by a take-up roller, the individual engaging elements and pseudo elements are smoothly removed from the engaging-element-forming cavities and the pseudo-element-forming cavities as being resiliently deformed into a straight posture. Then, while they restore an original shape and become gradually cooled, the engaging elements and pseudo elements are adjusted in height by the take-up roller and finally become hard. The thus obtained surface fastener as a semiproduct is cut between the central engaging-element-existing region and the opposite side pseudo-element-existing regions so that the pseudo-element-existing regions are taken away while the central engaging-element-existing substrate sheet with the engaging elements is wound up by a wind-up roller.

During the removing, as the amount of resin and thickness of the pseudo elements are more than those of the engaging elements to be molded in the central circumferential surface of the die wheel, the peeling resistance of the pseudo elements becomes larger as compared to the engaging elements so that the whole engaging elements can be removed by a substantially uniform peeling force through the entire width of the substrate sheet. As a result, there is no difference in peeling speed between the engaging elements and the pseudo elements through the entire width of the substrate sheet so that expansion of the substrate sheet will be uniform through its entire width, guaranteeing a high-quality, curve-free surface fastener.

In general, based on the difference in release of heat in the axial direction of the die wheel, the surface temperature at the central region of the die wheel is higher than that at the opposite side regions. This temperature difference causes the pseudo elements to become solidified at a higher speed as compared to the ordinary engaging elements if the amount of resin of each pseudo element is equal to that of the ordinary engaging element. According to this invention, the amount of resin of the pseudo element is larger than the ordinary engaging element, the heat capacity of the pseudo element would be increased. Therefore it is possible to make the speed of solidification of resin uniform through the entire width of the substrate even when the opposite side edges of the substrate sheet are lower in temperature than the central region based on the difference of cooling temperature between the opposite end surfaces and the central circumferential surface in the die wheel. This is the reason why the amount of resin of the pseudo element is more than that of the ordinary engaging element.

DETAILED DESCRIPTION OF THE PREFERRED EMBODIMENTS

Preferred embodiments of this invention will now be described in detail with reference to the accompanying drawings.

Figure 1:
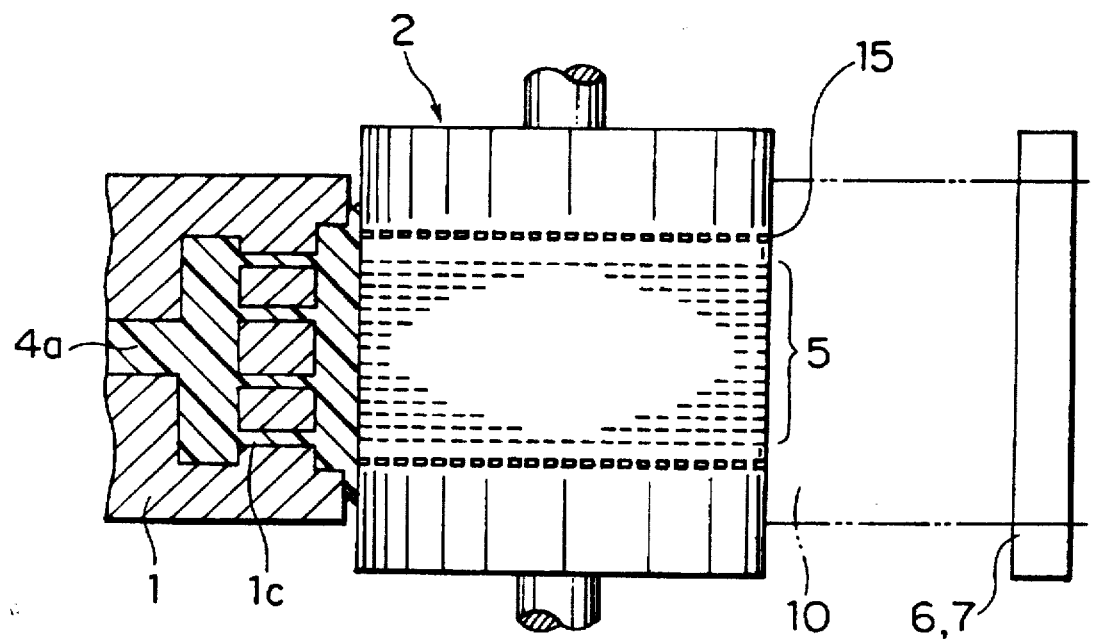
FIG. 1 is a plan view, with parts broken away, of a surface fastener manufacturing apparatus according to a first embodiment of this invention.
Figure 2:
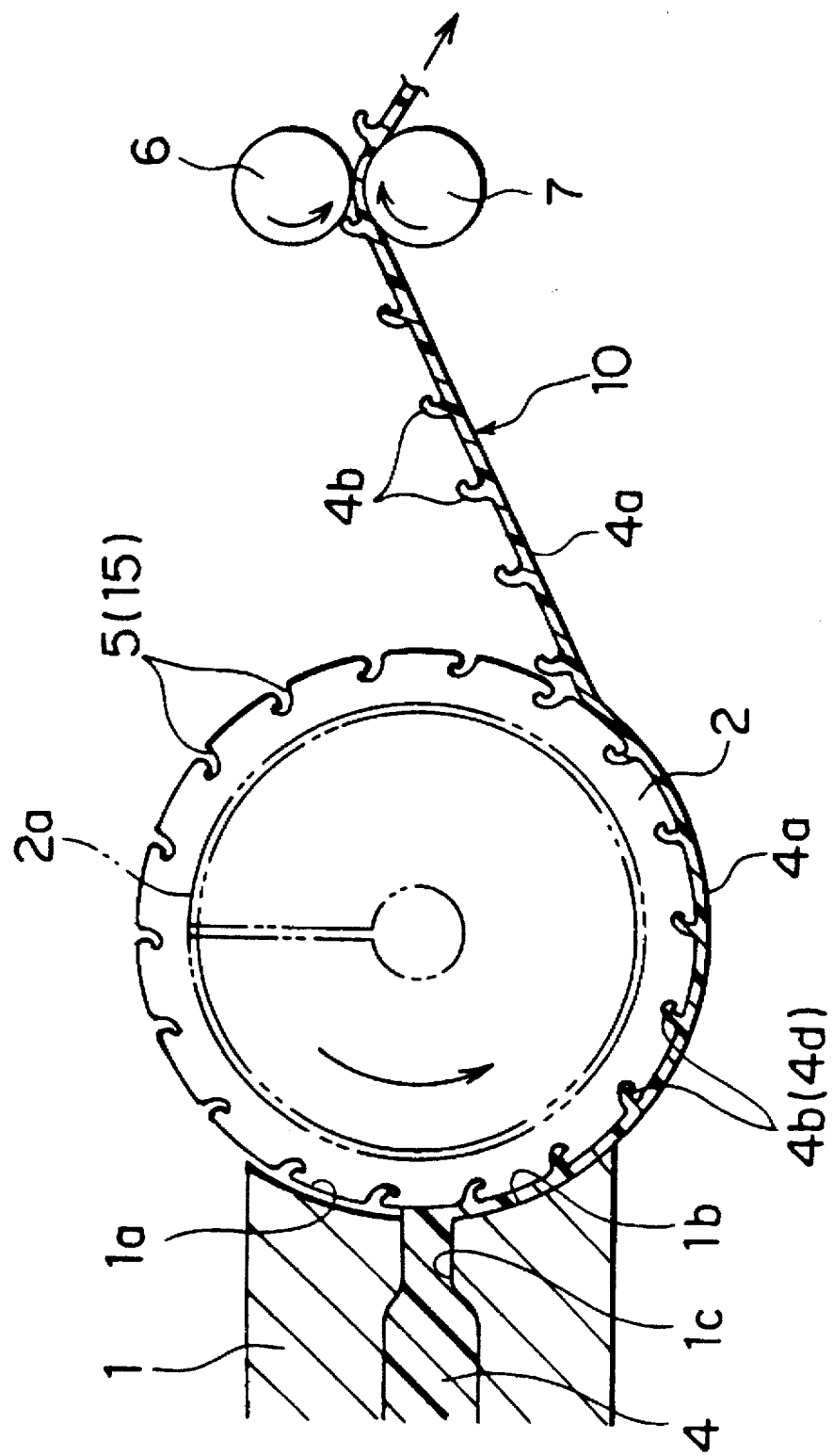
FIG. 2 is a longitudinal cross-sectional view of the apparatus of the first embodiment.

FIG. 1 is a plan view, with parts broken away, of a surface fastener manufacturing apparatus according to a first embodiment of this invention; in the apparatus a multiplicity of hooks are molded on one surface of a plate-like substrate sheet. FIG. 2 is a longitudinal cross-sectional view of the apparatus, and FIG. 3 is a fragmentary perspective view of a die wheel of the apparatus, showing the characteristic part of the die wheel.

Figure 3:
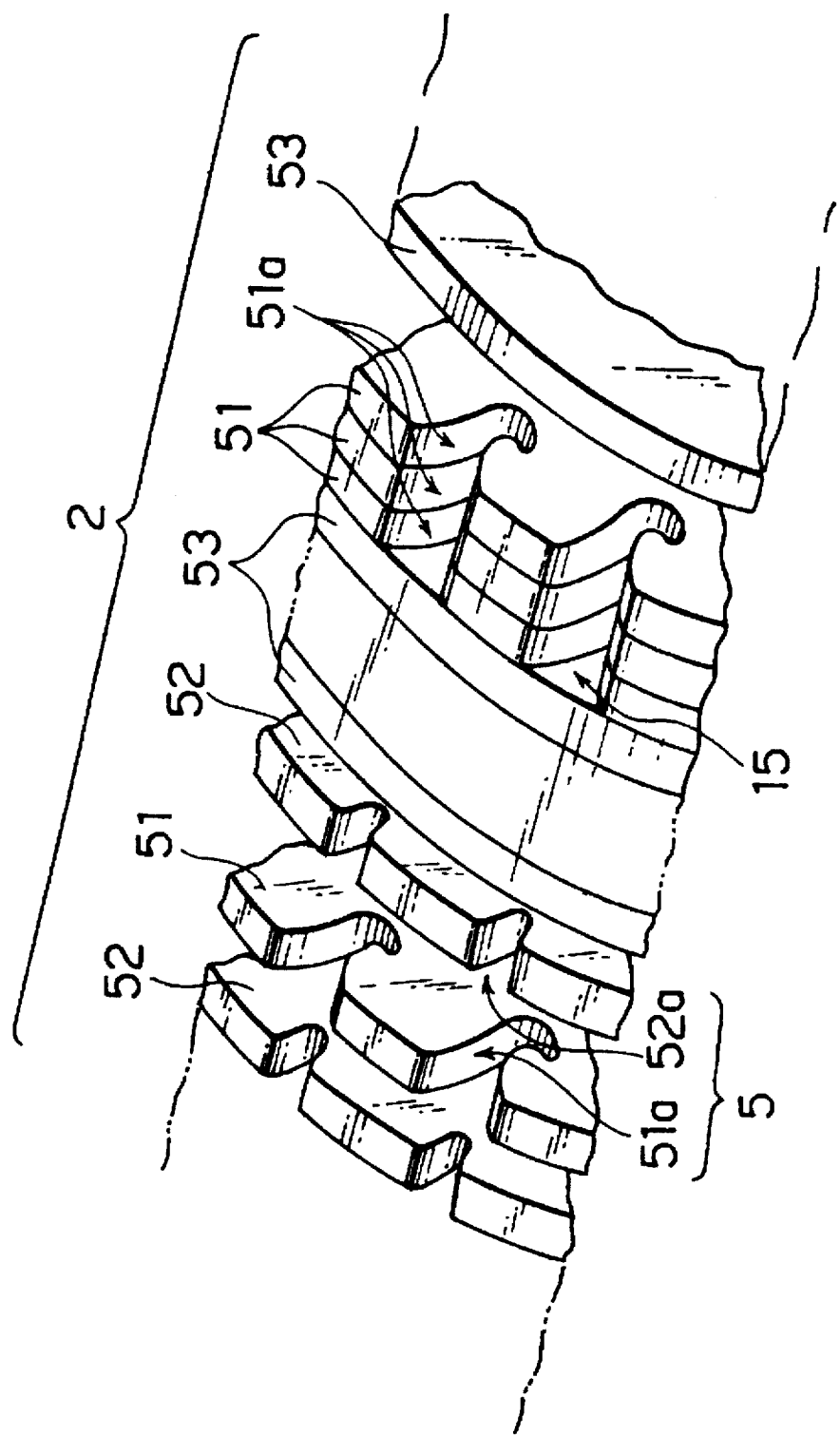
FIG. 3 is a fragmentary exploded perspective view of a die wheel to be used in the apparatus.

In FIGS. 1 through 3, reference numeral 1 is an extrusion nozzle. The upper half of an end surface of the nozzle 1 is an arcuate surface 1a having a curvature virtually equal to that of a die wheel 2 described below, while the lower half end surface is an arcuate surface 1b having a predetermined gap from a curved surface of the die wheel 2. The extrusion nozzle 1 is a T-shaped die, from an outlet of which molten resin 4 is to be extruded in the form of a sheet. According to this embodiment, the extrusion nozzle 1 has a centrally extending channel 1c. In the illustrated example, the end surface of the extrusion nozzle 1 is composed of two arcuate surfaces 1a, 1b; alternatively it may be a single arcuate surface having a curvature substantially the same as that of the circumferential surface of the die wheel 2.

Since the structure of the die wheel 2 is substantially identical with the structure disclosed in U.S. Pat. No. 4,794,028 mentioned above, it is described here briefly. The die wheel 2 is in the form of a hollow drum having in it a water cooling jacket 2a. Centrally in the hollow drum, a multiplicity of ring-shape plates laminated along the axis of the hollow drum. Specifically, as shown in FIG. 3, the hollow drum comprises a number of first plates 51 each having in its peripheral edge a multiplicity of hook-shape cutouts 51a at predetermined distances, a number of second plates 52 each having in its peripheral edge a multiplicity of reinforcing-rib-forming cutouts 52a aligned with the hook-shape cutouts 51a in a direction parallel to the axis of the drum, and a number of third plates 53 each having flat surfaces on either front and back sides. The die wheel 2 should by no means be limited to the illustrated structure; for example, each of every other ring-shape plates may have in one side surface a multiplicity of hook-forming cavities with the base of each hook opening to the circumferential surface of the drum at predetermined intervals, while one side surface of each of intermediate plates adjacent to the surface with the hook-forming cavities may have a multiplicity of reinforcing-rib-forming cavities in alignment with the individual hook-forming cavities. These plates are joined together in laminate.

In general, the second plates 52 are placed one over each side surface of the individual first plate 51, and the third plates 53 are placed one over each side surfaces of the resulting laminate, thus defining hook-forming cavities 5. Whereas in this invention, the die wheel 2 has, in addition to the hook-forming cavities 5, pseudo-hook-forming cavities 15 in opposite side circumferential surfaces, which constitutes a characteristic feature of this invention.

FIGS. 1 and 3 show an example of arrangement of the hook-forming cavities 5 and the pseudo-hook-forming cavities 15 on the circumferential surface of the die wheel 2. The pseudo-hook-forming cavities 15 at each side circumferential surface of the die wheel 2 are arranged alongside and spaced a predetermined distance from the hook-forming cavities 5 of the central region of the die wheel 2.

The shape of the pseudo-hook-forming cavities 15 is defined by three of the first plates 51 in laminate as shown in FIG. 3. Accordingly the pseudo-hook-forming cavities 15 are identical in side shape with the ordinary hooks 4b and have a total thickness substantially three times that of the ordinary hook 4b. The thickness of the pseudo hook should by no means be limited to this illustrated example; for example, the first plates 51 may be combined in various different ways to change the thickness. Further, as long as the cooling speed and peeling resistance of thermoplastic resin to be filled in the pseudo-hook-forming cavities 15 are substantially identical with those of the ordinary-hook-forming cavities 5 to be formed at the central region of the die wheel, they may have various alternative shapes such as a mushroom shape or a palm tree shape, etc. and any other thickness.

Figure 5:
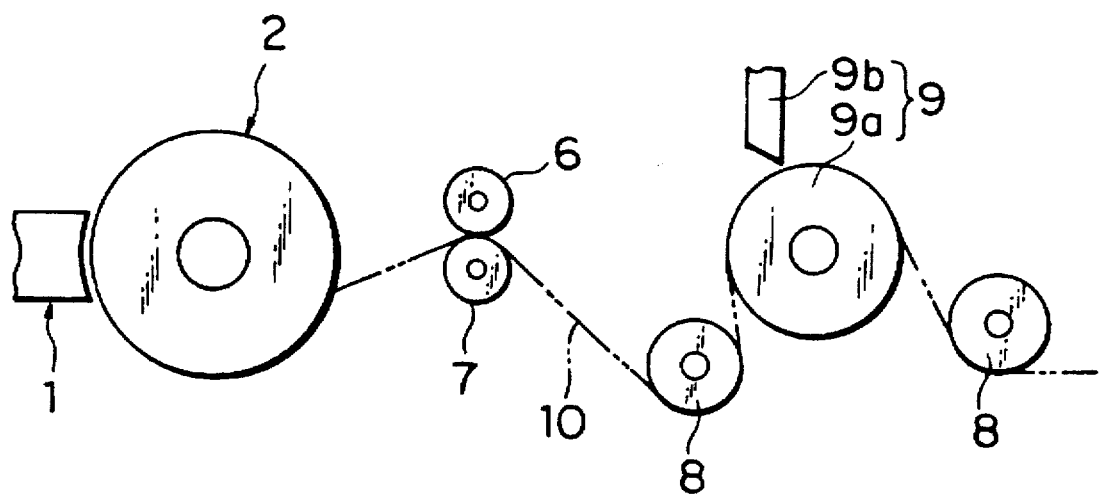
FIG. 5 is a side view schematically showing the whole apparatus of the first embodiment.
Figure 6:
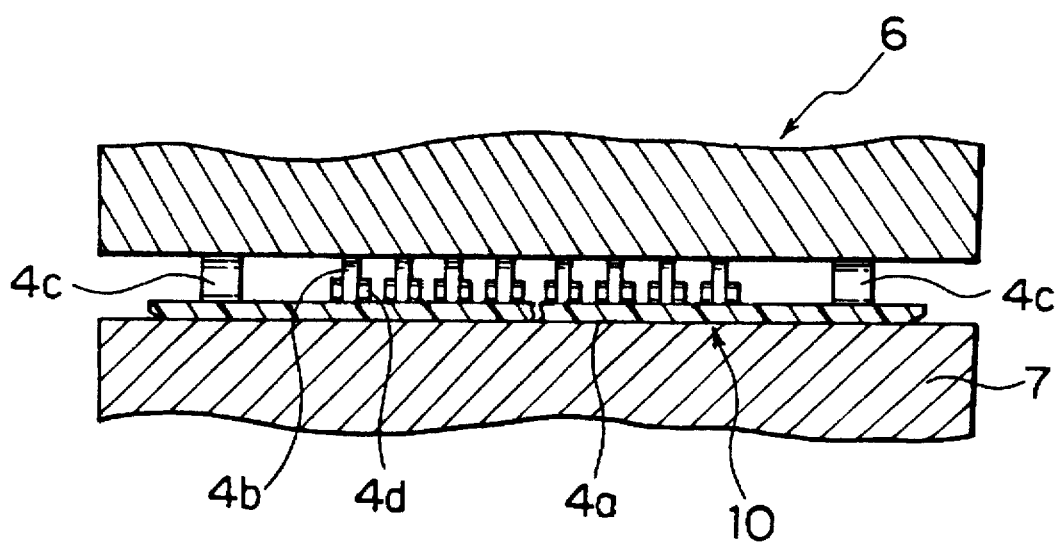
FIG. 6 is a fragmentary cross-sectional view of a surface fastener take-up roller to be used in the apparatus.

The die wheel 2 is rotatable, in a direction indicated by an arrow, as driven by a non-illustrated known drive unit. Further, as shown in FIG. 5, in front of the die wheel 2, a set of upper and lower take-up rollers 6, 7 is situated, and in front of the upper and lower take-up rollers 6, 7, a first guide roller 8, a cutting unit 9, which is composed of a cutting roller 9a and a cutting blade 9b, a second guide roller 8, a non-illustrated wind-up roller, etc. are situated in this order. In this embodiment, in order to remove a molded surface fastener 10, as a semi-product, from the die wheel 2, the set of upper and lower take-up rollers 6, 7 rotatable in opposite directions in synchronism with each other is used as shown in FIG. 6. The circumferential surface of each of the upper and lower take-up rollers 6, 7 is smooth, and the gap between the upper and lower take-up rollers 6, 7 is set to be smaller than the thickness of the surface fastener 10 when the hooks 4b are removed. The hooks 4b would deform to rise slightly when removed from the hook-forming cavities 5, increasing in height. The gap between the upper and lower take-up rollers 6, 7 serves to adjust the increased height of the hooks 4b to a set value by compressing them.

Although the circumferential surfaces of the upper and lower take-up rollers 6, 7 are merely smooth, they may have a groove for receiving the rows of hooks 4b, in which case the depth of the groove is set to be smaller than the height of hooks 4b. The rotating speed of the take-up rollers 6, 7 is determined to be slightly faster than the rotating speed of the die wheel 2 so that the hooks 4b can be removed smoothly from the hook-forming cavities 5.

Figure 7:
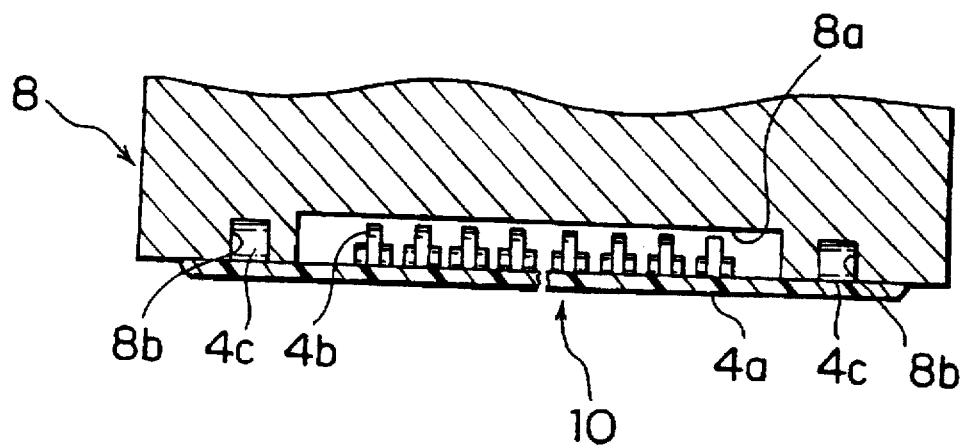
FIG. 7 is a fragmentary cross-sectional view of a surface fastener guide roller to be used in the apparatus.

FIG. 7 is a fragmentary cross-sectional view showing the manner that the surface fastener 10 is guided by the guide roller 8. As shown in FIG. 7, the guide roller 8 has in its circumferential surface a first groove 8a for passage of the hooks 4b and a pair of second grooves 8b for passage of the pseudo hooks 4c. The depth of the first groove 8a is set to be larger than the height of the hooks 4b, while the depth of the second groove 8b is substantially the same as the height of the pseudo hooks 4c. With this designing, it is possible to position the molded surface fastener 10 for accurate feeding and to cut the molded surface fastener 10 accurately along predetermined cutting lines, and at the same time, the hooks 4b are kept from being damaged by the guide roller 8.

In this embodiment, the extrusion nozzle 1 is situated facing the circumferential surface of the die wheel 2 as being directed toward the axis of rotation in parallel, with a gap substantially equal to the thickness of the substrate sheet 4a. Therefore, molten thermoplastic resin 4 extruded in a sheet form from the extrusion nozzle 1 is forced into the gap between the extrusion nozzle 1 and the die wheel 2 in rotation by extrusion pressure. As a result the substrate sheet 4a is molded between the lower arcuate surface 1b of the extrusion nozzle 1 and the circumferential surface of the die wheel 2 and, at the same time, part of the molten thermoplastic resin 4 is filled in the hook-forming cavities 5 and the pseudo-hook-forming cavities 15 to mold a multiplicity of hooks 4b and pseudo hooks 4c simultaneously. In this embodiment, no pressure roller is necessary, and a lower part of the die wheel 2 is soaked in a non-illustrated cooling bath for cooling from outside. The existence of the cooling bath increases the speed of cooling of the molded surface fastener 10 so that the operating speed of the whole apparatus can be improved and that a tough surface fastener 10 having an excellent crystal structure can be molded.

Figure 4:
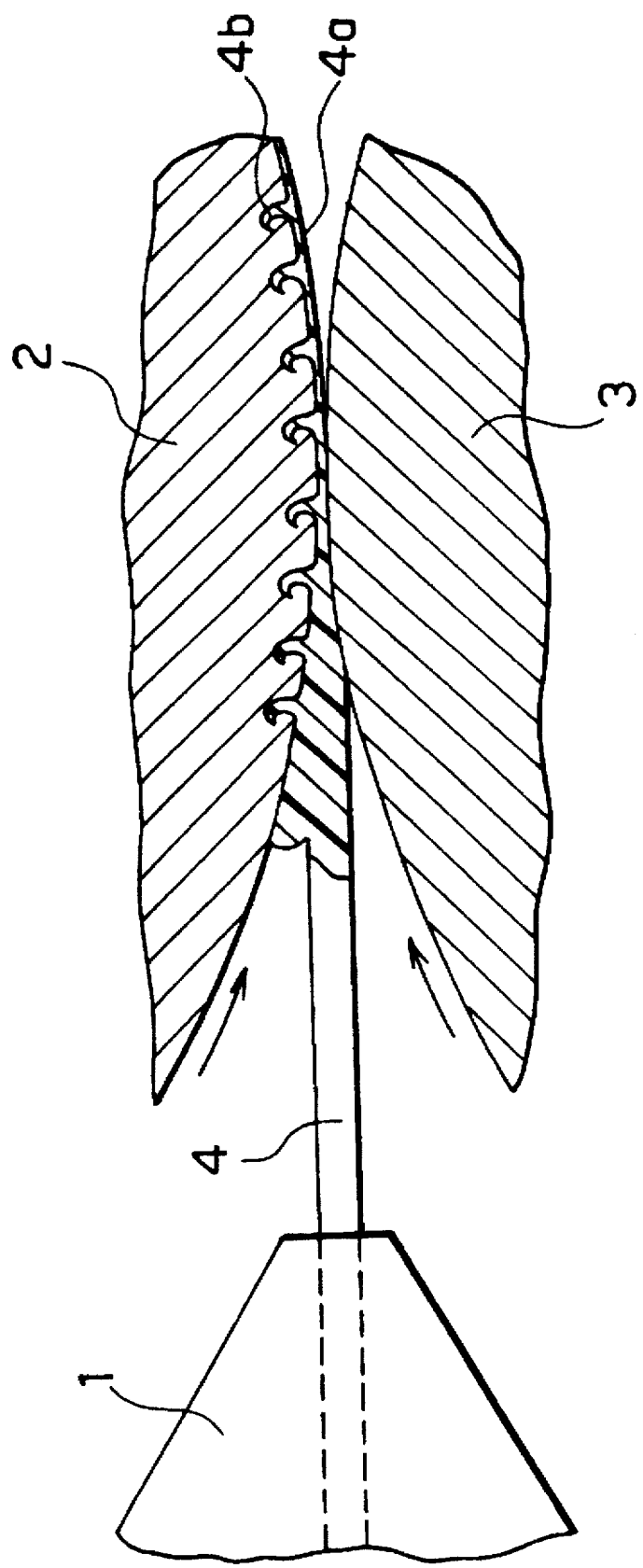
FIG. 4 is a fragmentary longitudinal cross-sectional view of a surface fastener manufacturing apparatus according to a second embodiment.

However, the molding of this invention should by no means be limited to the foregoing manner. For example, as shown in FIG. 4, a pressure roller 3 may be provided facing the die wheel 2 with their axes being parallel with each other. In such a case, the extrusion nozzle 1 is directed toward a gap between the die wheel 2 and the pressure roller 3, the molten resin 4 is extruded into the gap where it is pressed.

Thus the substrate sheet 4a is pressed and molded between the circumferential surfaces of the die wheel 2 and the pressure roller 3, while a part of the molten resin 4 is filled in the hook-forming cavities 5 and the pseudo-hook-forming cavities 15 so that a multiplicity of hooks 4b and pseudo hooks 4c can be molded.

The resin material of the surface fastener 10 to be used in this invention is exemplified by thermoplastic resin such as nylon, polyester and polypropylene. During the molding, the molten resin temperature, extrusion pressure, die wheel temperature, speed of rotation of the die wheel, etc. should of course be controlled in accordance with the material used.

According to the apparatus constructed as mentioned above with reference to FIG. 5, molten resin 4 extruded from the extrusion nozzle 1 is forced into the gap between the extrusion nozzle 1 and the die wheel 2 in rotation, and part of the extruded molten resin 4 is gradually charged in the hook-forming cavities 5 and the pseudo-hook-forming cavities 15 to mold hooks 4b and the pseudo hooks 4c and to continuously mold a plate-like substrate sheet 4a having a predetermined thickness and a predetermined width. The molded substrate sheet 4a, the hooks 4b and the pseudo hooks 4c are moved around substantially one third of the circumferential surface of the die wheel 2, during which they are cooled from the inside of the die wheel 2 to gradually become hard. During this hardening, when the molded substrate sheet 4a is pulled under a suitable force by the upper and lower take-up rollers 6, 7, the individual hooks 4b and the individual pseudo hooks 4c, will be removed smoothly from the hook-forming cavities 5 and the pseudo-hook-forming cavities 15 as they resiliently deform into a straight form. While the hooks 4b and the pseudo hooks 4c restore their original shape and are gradually cooled, the hooks 4b and the pseudo hooks 4c are corrected to have a desired height by the take-up rollers 6, 7 and become hard.

Figure 8:
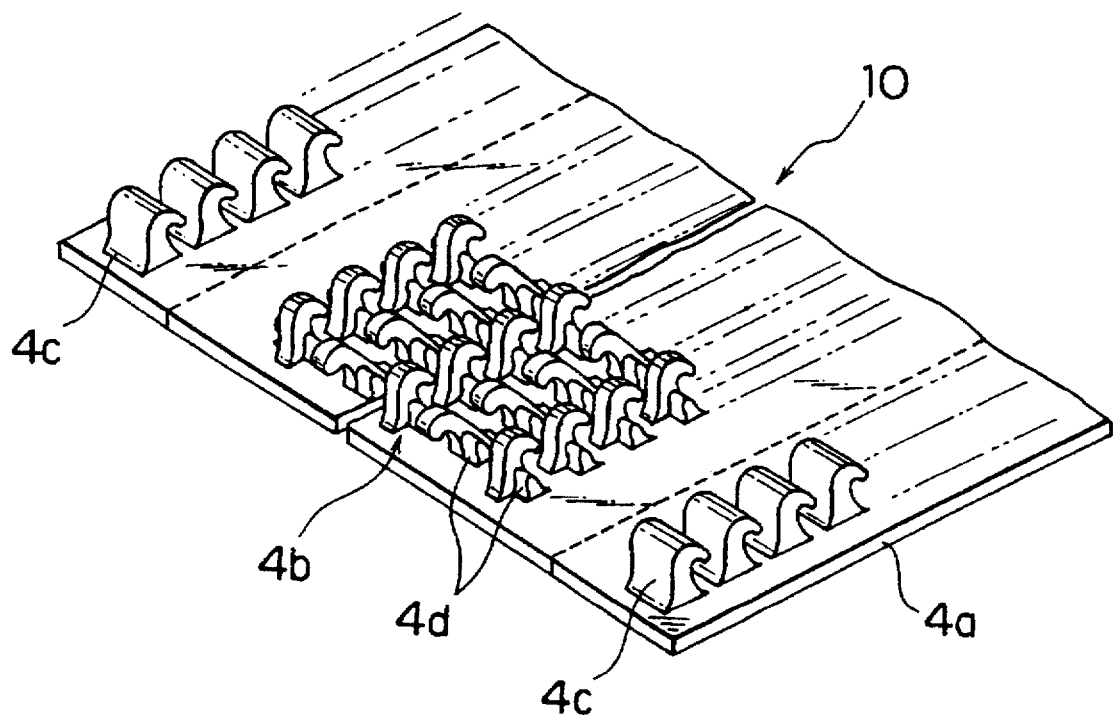
FIG. 8 is a fragmentary perspective view showing a typical structural example of a molded surface fastener to be manufactured according to this invention.
Figure 9:
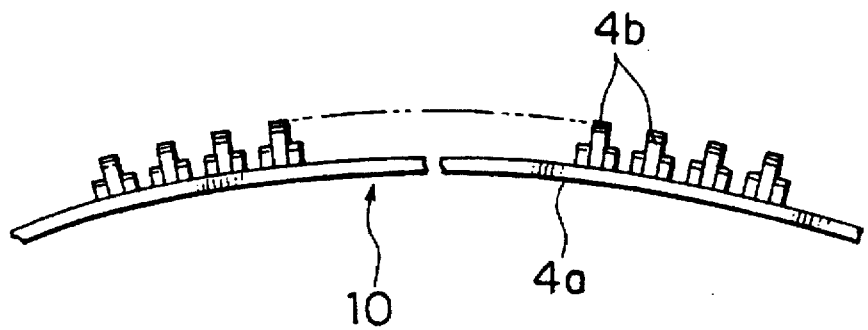
FIG. 9 is a front view schematically showing a surface fastener, as a semiproduct, to be manufactured by extrusion on a conventional apparatus.
Figure 10:
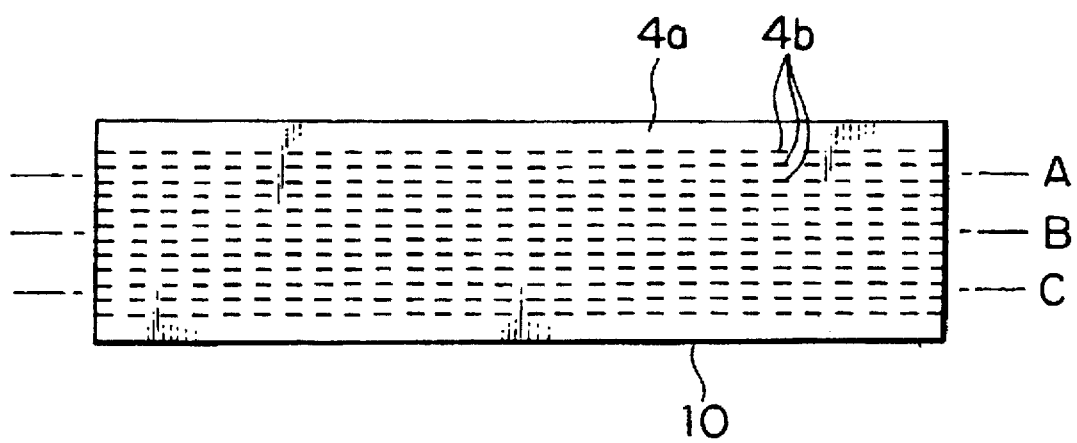
FIG. 10 is a plan view of FIG. 9.
Figure 11:
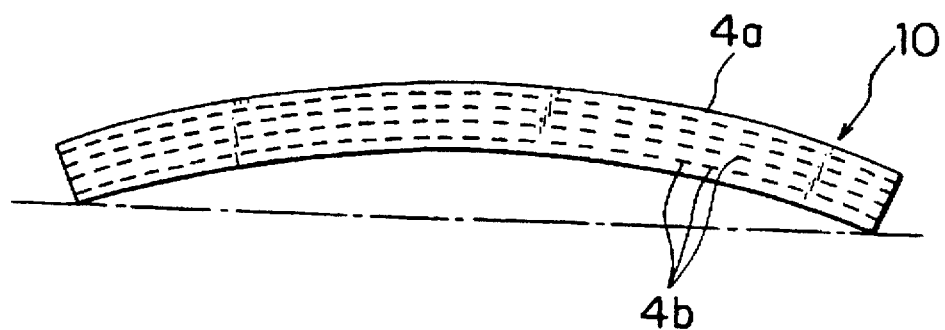
FIG. 11 is a plan view schematically showing one of surface fasteners, as final products, to be obtained by cutting the surface fastener semiproduct along opposite side regions and a central line.

FIG. 8 shows part of the surface fastener 10 to be thus obtained. The molded surface fastener 10 to be removed from the die wheel 2 is cut along cutting lines between the ordinary hooks 4b and the pseudo hooks 4c while the surface fastener 10 passes the cutting unit 9 which is composed of the cutting roller 9a and the cutting blade 9b. Then the pseudo-hook-existing side edges of the substrate sheet 4a are discharged out of the apparatus, and the hook-existing central region of the substrate sheet 4a with the hooks 4b is wound up by a non-illustrated wind-up roller. In this embodiment, each hook 4b has a pair of mount-shape reinforcing ribs 4d integrally molded one on each of opposite side surfaces.

During peeling, since the pseudo hooks 4c is large in amount of resin and thickness as compared to the ordinary hooks 4b at the central region of the sheet 2, their peeling resistance would become larger than that of the ordinary hooks 4b so that the hooks 4b can be removed under a substantially uniform peeling force through the entire width of the substrate sheet 4a. As a result, the hooks 4b and the pseudo hooks 4c can be removed with no time difference between them through the entire width of the substrate sheet 4a so that the hooks 4b and the pseudo hooks 4c are removed uniformly, causing uniform expansion of the substrate sheet 4a. Accordingly it is possible to manufacture a high-quality, curve-free surface fastener 10.

In general, with regard to the surface temperature of the die wheel 2, partly since the opposite side peripheral surfaces are exposed to the outside and partly since there is a difference in heat amount to be released between the opposite side regions where no molding is performed and the central region where molding is done, the surface temperature at the central region of the die wheel 2 is higher than that at the opposite side regions. This temperature difference causes the pseudo hooks 4c to become solidified at a higher speed as compared to the ordinary hooks 4a if the amount of resin of the pseudo hooks 4c is equal to that of the ordinary hooks 4a. According to this invention, the amount of resin of the pseudo hooks 4c is larger than the ordinary hooks 4a, the heat capacity of the pseudo hooks 4c would become increased. Therefore it is possible to make the speed of solidification of resin uniform through the entire width of the substrate sheet 4a. This is the reason why the amount of resin of the pseudo hooks 4c is more than that of the ordinary hooks 4b.

According to the foregoing method, since the pseudo hooks 4c molded with a predetermined distance from each side edge of the hook-existing central region are removed from the die wheel 2 simultaneously with the removing of the ordinary hooks 4b and then the opposite side edges of the substrate sheet 4a are cut off to make a surface fastener, it is possible to peel the substrate sheet 4a by a uniform pulling force through the entire width so that the whole surface fastener is free from being curved or puckered. Therefore it is possible to manufacture a uniform surface fastener effectively and continuously in a single process, not requiring a plurality of complex processes.

What is claimed is:

1. A method of continuously manufacturing a surface fastener, comprising:

(a) extruding molten thermoplastic resin, in a predetermined width, from an extrusion nozzle to a circumferential surface of a die wheel having a multiplicity of engaging-element-forming cavities;

(b) driving said die wheel for rotation;

(c) molding a multiplicity of engaging elements integrally with a plate-like substrate sheet while filling the molten thermoplastic resin in said engaging-element-forming cavities of said die wheel in rotation; and (d) molding pseudo elements integrally with said substrate sheet along opposite side edges across said width of said substrate sheet, using pseudo-element-forming cavities in opposite side circumferential surfaces of said die wheel, simultaneously with said molding of said engaging elements, said pseudo elements shaped to have a larger peeling resistance from said pseudo-element-forming cavities than a peeling resistance of said engaging elements from said engaging-element-forming cavities.

2. A surface fastener manufacturing method according to claim 1, wherein after molding said surface fastener, said substrate sheet is cut longitudinally between said engaging elements and said pseudo elements.

3. A surface fastener manufacturing method according to claim 1, wherein said die wheel is cooled.

4. A surface fastener manufacturing method according to claim 1, wherein said extrusion nozzle is directed perpendicularly toward the circumferential surface of said die wheel to extrude molten thermoplastic resin of a predetermined width, directly to the circumferential surface of said die wheel.

5. A surface fastener manufacturing method according claim 1, wherein a pressure wheel is situated facing said die wheel with their axes in parallel, and said extrusion nozzle is directed to a pressure space between said die wheel and said pressure wheel and extrudes molten thermoplastic resin in the predetermined width into the pressure space.

6. An apparatus for continuously manufacturing a surface fastener, comprising:
   (a) a die wheel having in its circumferential surface a multiplicity of engaging-element-forming cavities and adapted to be driven for rotation in one way; and
   (b) an extrusion nozzle situated facing the circumferential surface of said die wheel and having inside a predetermined width of molten thermoplastic resin extrusion channel;
   (c) said die wheel further having in opposite side circumferential surfaces a plurality of pseudo-element-forming cavities spaced a predetermined distance from said engaging-element-forming cavities, said pseudo-element-forming cavities shaped to have a greater resistance to peeling therefrom of solidified molten thermoplastic resin than a resistance of said engaging-element-forming cavities to peeling therefrom of solidified molten thermoplastic resin.

7. A surface fastener manufacturing apparatus according to claim 6, wherein each of said pseudo-element-forming cavities has a transverse thickness larger than that of each of said engaging-element-forming cavities.

8. A surface fastener manufacturing apparatus according to claim 6, wherein said die wheel is equipped with cooling means.

9. A surface fastener manufacturing apparatus according to claim 6, wherein said extrusion nozzle is directed perpendicularly toward the circumferential surface of said die wheel with a predetermined space therebetween.

10. A surface fastener manufacturing apparatus according to claim 6, further including a pressure wheel situated facing said die wheel with their axes in parallel, said extrusion nozzle being directed to a pressure space between said die wheel and said pressure wheel.

* * * * *